United States Patent [19]
Jackovitz

[11] 4,311,422
[45] Jan. 19, 1982

[54] SCREW RETAINER

[75] Inventor: Frank J. Jackovitz, Ramsey, N.J.

[73] Assignee: Midland-Ross Corporation, Cleveland, Ohio

[21] Appl. No.: 151,409

[22] Filed: May 19, 1980

[51] Int. Cl.³ .................... F16B 17/00; F16B 37/02
[52] U.S. Cl. ................................ 411/112; 403/357; 411/520
[58] Field of Search .......... 85/36, 32 V; 151/41.75; 24/217R; 220/3.6, 3.8, 3.2; 174/53, 58; 403/357; 411/520, 525, 526, 527, 516, 112

[56] References Cited
U.S. PATENT DOCUMENTS

| | | | |
|---|---|---|---|
| 1,328,488 | 1/1920 | Bowden | 151/41.75 X |
| 2,555,292 | 5/1951 | Poupitch | 151/41.75 X |
| 3,226,145 | 12/1965 | Goldberg | 151/41.75 X |
| 3,955,463 | 5/1976 | Hoehn | 85/36 |
| 4,036,389 | 7/1977 | Pate et al. | 85/36 X |
| 4,069,448 | 1/1978 | Gernhardt | 85/36 X |
| 4,071,159 | 1/1978 | Robinson et al. | 85/36 X |
| 4,143,696 | 3/1979 | Holton et al. | 85/36 X |

*Primary Examiner*—Ramon S. Britts
*Attorney, Agent, or Firm*—H. Duane Switzer

[57] ABSTRACT

A screw retainer comprises a substantially flat clip having a central resilient tang engaged by a screw for preventing withdrawal of the screw from an opening. Engagement of the screw with the tang also causes a reversely curved porton of the tang to engage an abutment for preventing withdrawal of the clip from a slot in which it is positioned adjacent a screw receiving hole.

11 Claims, 11 Drawing Figures

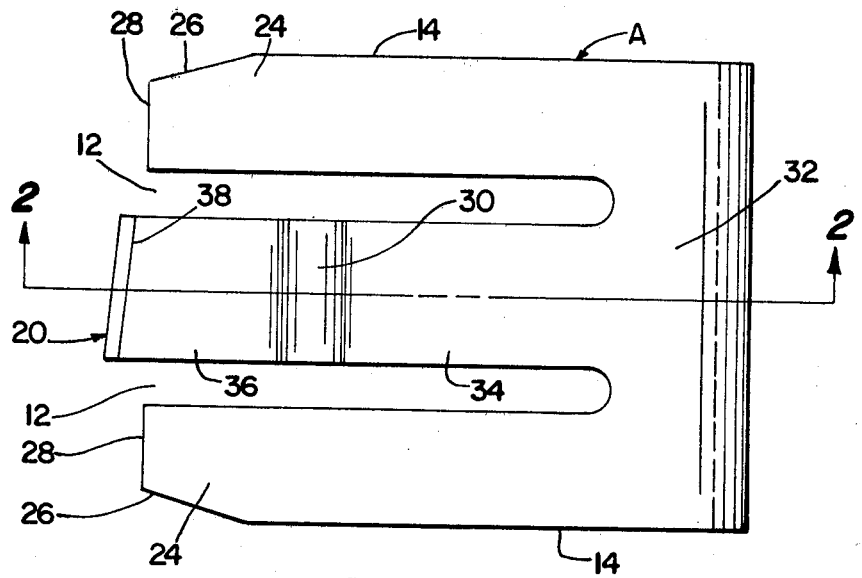
Fig. 1
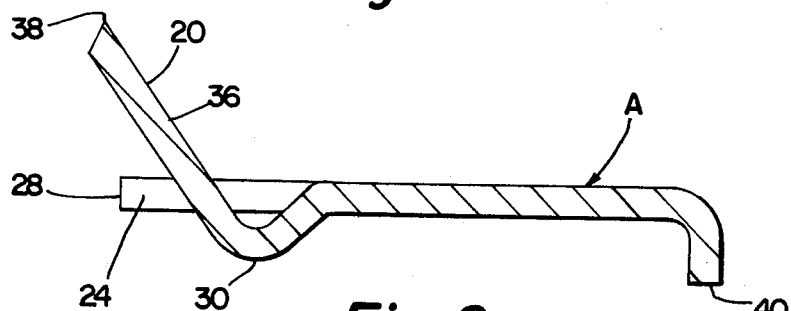
Fig. 2
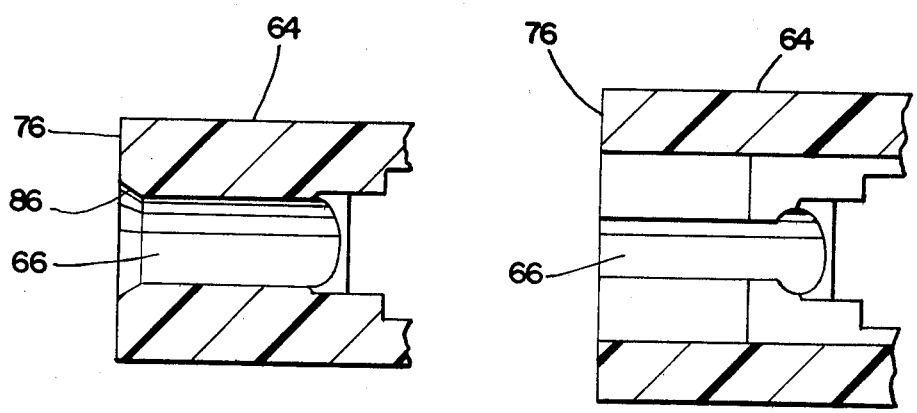
Fig. 5
Fig. 6

SCREW RETAINER

BACKGROUND OF THE INVENTION

This application relates to the art of screw retainers and, more particularly, to screw retainers of the type having a resilient tang engageable with a screw for preventing withdrawal of the screw from a hole. The invention is particularly applicable for use with electrical outlet boxes and will be described with particular reference thereto. However, it will be appreciated that the invention has broader aspects and may be used for mounting screws on other devices.

A known arrangement for mounting screws includes the use of a metal clip having a resilient tang engageable by the screw. A pushing force applied to a screw causes its threads to ratchet past the resilient tang so the screw can be moved to its final position very rapidly. Final tightening of the screw can be accomplished by rotating same, and removal of the screw is also possible by rotating same in an opposite direction.

In screw mounting arrangements of the type described, the clip is mounted to a device in which the screw will be positioned. The mounting arrangement for the clip must be relatively strong to prevent withdrawal of the clip. In many previous arrangements, the clip has a separate tang or latch for securing same in position, and the securing force is independent of the engagement between the screw and resilient tang. In other arrangements, engagement of the screw with the resilient tang causes expansion of the clip into engagement with a hole. Many of the previous arrangements also require very complicated metal clips which are very difficult to form.

SUMMARY OF THE INVENTION

A screw mounting clip is substantially flat and has a central resilient tang engageable by a screw. Engagement of the tang by a screw urges a reversely curved portion of the tang into engagement with an abutment for preventing withdrawal of the clip from a slot in which it is positioned.

It is a principal object of the present invention to provide an improved screw mounting arrangement.

It is an additional object of the invention to provide an improved clip for mounting screws.

It is also an object of the present invention to provide a screw mounting clip which is very simple and economical to manufacture, and very simple to assemble.

BRIEF DESCRIPTION OF THE DRAWING

FIG. 1 is a top plan view of a screw mounting clip;

FIG. 2 is a cross-sectional elevational view taken generally on line 2—2 of FIG. 1;

FIG. 5 is a partial cross-sectional elevational view taken generally on line 5—5 of FIG. 3;

FIG. 6 is a partial cross-sectional elevational view taken generally on line 6—6 of FIG. 3;

DESCRIPTION OF A PREFERRED EMBODIMENT

Figure 3:
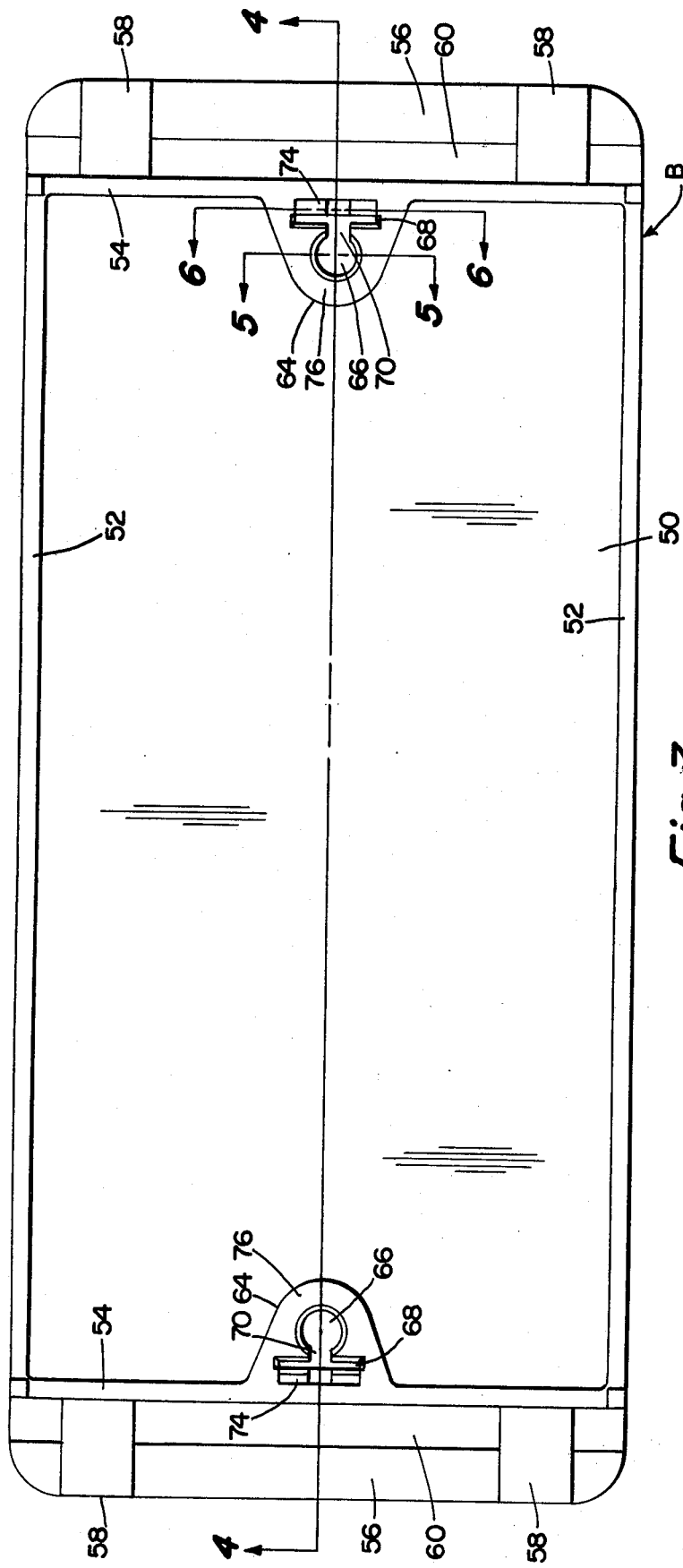
FIG. 3 is a front elevational view of an electrical outlet box.

With reference to the drawing, FIGS. 1 and 2 show a screw mounting clip A including a substantially flat main body portion having opposite end portions. A pair of substantially parallel spaced-apart slits 12 are formed in the flat main body portion from one end portion thereof toward the other end portion thereof. The slits 12 are spaced inwardly from the opposite side edges 14 of the main body portion, and form an elongated central resilient tang 20 which extends over a major portion of the length of the flat main body portion. Opposite fingers 24 are defined in the flat main body portion between the slits 12 and the opposite side edges 14. The fingers 24 are cut-away or sloped as at 26 on the outer edges thereof adjacent the finger free ends 28. In effect, the sloping portions 26 provide fingers 24 with a width at their free ends 28 which is substantially less than the width thereof along the rest of their length.

Resilient tang 20 is formed with an abutment 30 by deforming tang 20 downwardly at an angle of approximately 45° and then reversely curving the tang to extend upwardly at an included angle with the vertical of approximately 35°. Thus, the included angle between the downwardly bent portion of the tang and the upwardly bent portion thereof is approximately 80°. One end portion of tang 20 is integrally connected with the flat main portion of the clip as generally indicated at 32 in FIG. 1. Tang 20 has a flat tang portion 34 extending from the tang connected end portion 32 to the tang abutment projection 30, and has a tang inclined portion 36 extending upwardly from the tang abutment projection 30 to the free tang edge 38 which is inclined to the longitudinal axis of the tang 20 as shown in FIG. 1 at an angle approximately corresponding to the angle formed by the threads of a screw adapted to engage the tang edge.

One end portion of the clip A is provided with a flange 40 bent downwardly therefrom in the same direction as the tang abutment projection 30. Tang 20 is resiliently deformable along its flat portion between the tang abutment projection 30 and its connected end portion 32, and along its inclined portion between the tang abutment projection 30 and the screw engaging tang edge 38.

Figure 4:
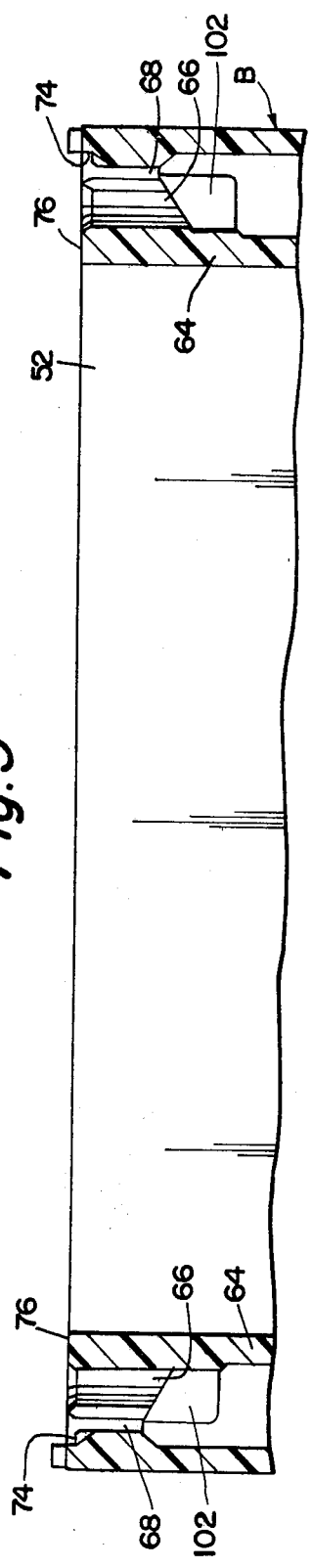
FIG. 4 is a partial cross-sectional elevational view taken generally on line 4—4 of FIG. 3.

FIGS. 3 and 4 show an electrical outlet box B molded of synthetic plastic material which may or may not be reinforced. Box B includes a bottom wall 50, opposite sidewalls 52 and opposite end walls 54. Opposed projections generally indicated at 56, 58 in FIG. 3 are provided on the exterior of the end walls 54 to form a nail receiving groove 60 in which a nail is received for securing box B to the side of a wall stud or the like.

Enlarged central bosses 64 are formed integral with end walls 54 and project inwardly of box B. Bosses 64 are internally formed for mounting screws which secure a switch or electrical socket within box B.

Each boss 64 has a substantially cylindrical screw receiving hole 66 and a generally rectangular flat slot 68 extending substantially parallel to the longitudinal axis of screw receiving hole 66. A central connecting slot 70 connects screw receiving hole 66 with flat slot 68.

Figure 11:
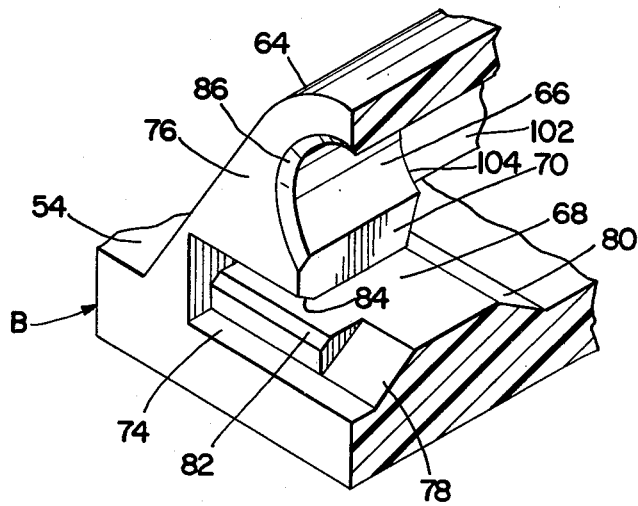
FIG. 11 is a broken-away perspective illustration of the slot and hole of FIGS. 9 and 10.

A recess 74 extends inwardly from outer surface 76 of boss 64. An upwardly sloping cam surface 78 extends from the bottom of recess 74 to the bottom of flat slot 68 as shown in FIG. 11. An abutment shoulder 80 slopes downwardly from the bottom of flat slot 68 in spaced relationship to cam surface 78. The intersections of flat slot 68 with recess 74 are bevelled as generally indicated at 82 and 84. The intersection of screw receiving hole 66 with outer surface 76 of boss 64 is also bevelled as generally indicated at 86.

Figure 7:
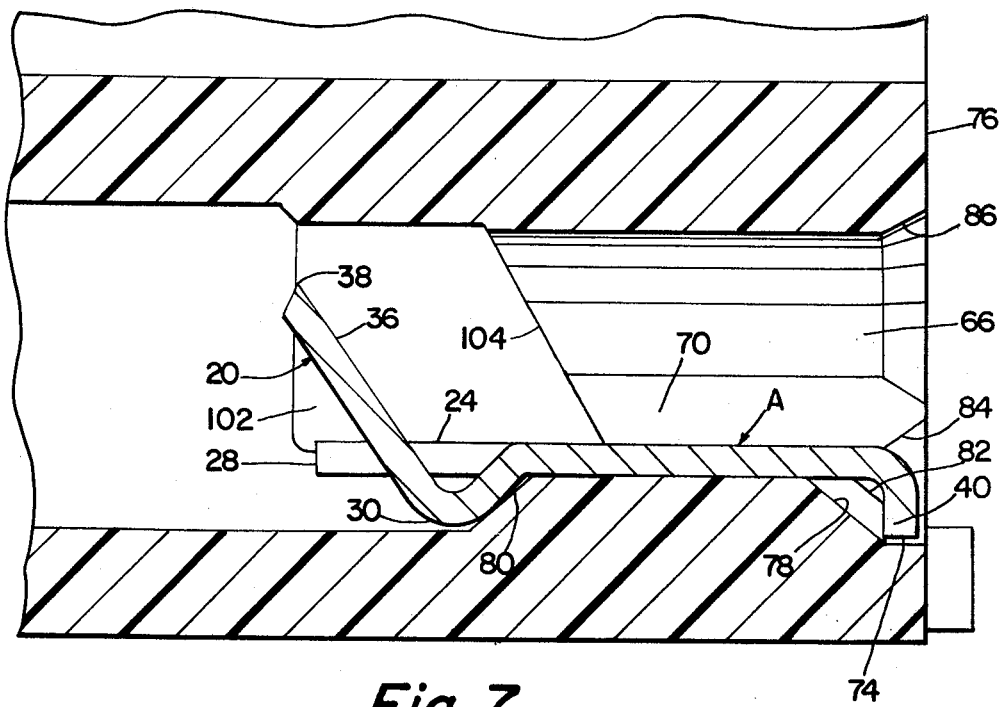
FIG. 7 is an enlarged partial cross-sectional elevational view showing the clip positioned in a device having a hole for receiving a screw.
Figure 8:
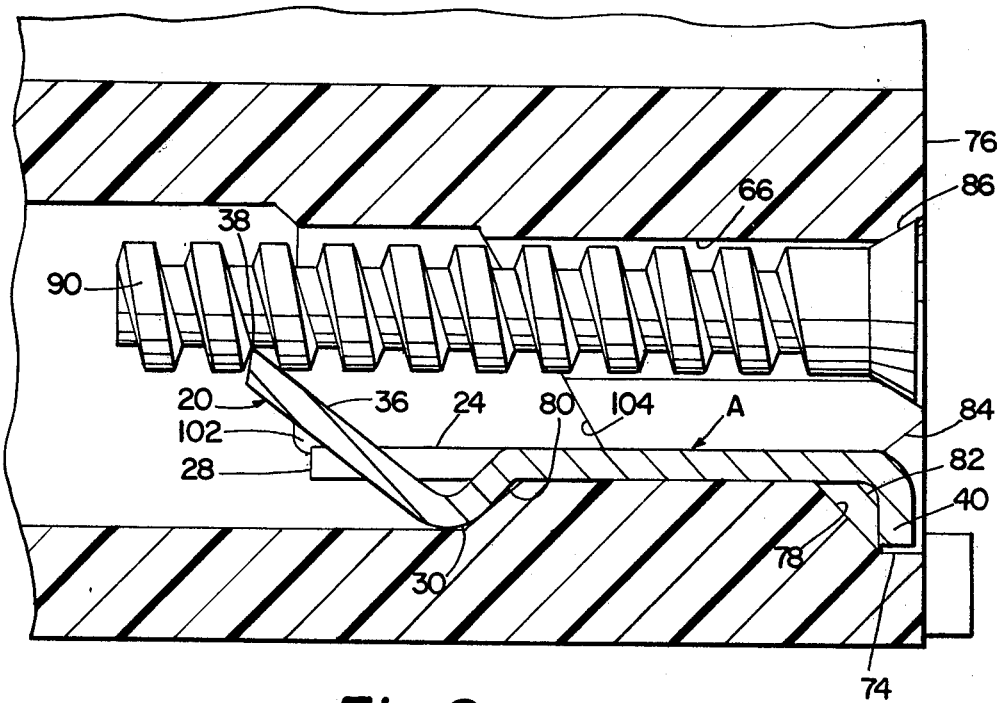
FIG. 8 is a view similar to FIG. 7 and showing a screw engaging the clip.
Figure 9:
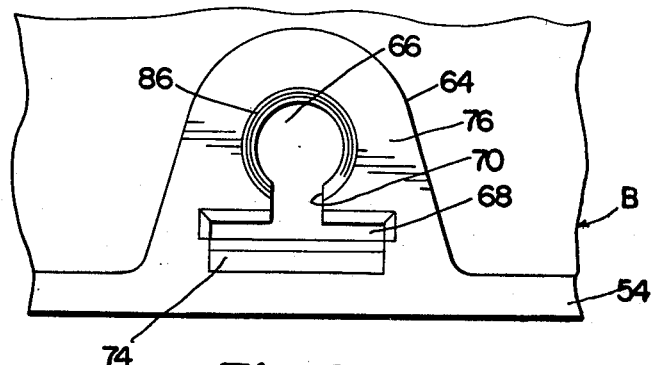
FIG. 9 is a front elevational view of a slot and hole for receiving a clip and screw.
Figure 10:
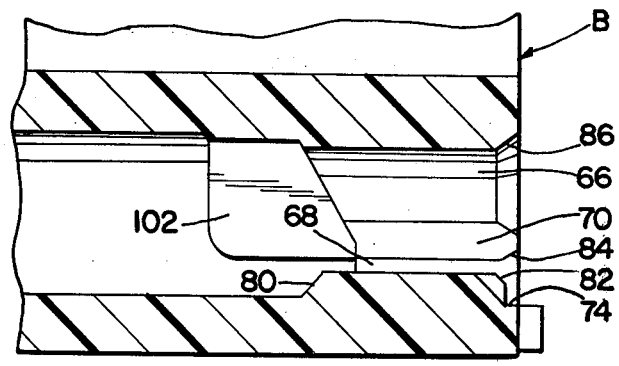
FIG. 10 is a cross-sectional elevational view of the slot and hole of FIG. 9.

The width of flat slot 68 in boss 64 is approximately the same as the width of screw mounting clip A across the opposite side edges 14 thereof. The width of connecting slot 70 is only slightly larger than the width of resilient tang 20 so that tang 20 will be closely received in the connecting slot. Sloping edges 26 on fingers 24 facilitate insertion of clip A into flat slot 68. Bevelled surfaces 82 and 84 at the entrance to flat slot 68 also facilitate insertion of the clip. Clip A is pushed into flat slot 68 with resilient tang 20 aligned with connecting slot 70. Tang abutment projection 30 engages cam surface 78 for allowing the tang to bend resiliently upwardly for sliding over the cam surface. The clip is pushed rearwardly until tang abutment projection 30 is in engagement with abutment shoulder 80 as shown in FIG. 7. In this position, clip flange 40 is closely received within recess 74 so that the clip is completely recessed beneath boss outer surface 76 as shown in FIG. 7. The inner surface of flange 40 engages the bottom of recess 74 while abutment projection 30 engages abutment shoulder 80. Inclined tang portion 36 extends upwardly past the longitudinal axis of screw receiving hole 66 as shown in FIG. 7. A screw 90 in FIG. 8 is dimensioned to be closely received in hole 66. Screw 90 is simple pushed longitudinally into hole 66 and the engagement of the screw with inclined tang portion 36 causes inclined tang portion 36 to deform downwardly as shown in FIG. 8 so that tang free edge 38 simply ratchets past the threads on screw 90. Once screw 90 is substantially completely received within hole 66 as shown in FIG. 8, screw 90 may be rotated clockwise for final tightening of same. Screw 90 may also be rotated counterclockwise for removing same from hole 66. The bending force provided on inclined tang portion 36 by screw 90 firmly engages tang abutment projection 30 with abutment shoulder 80 for preventing withdrawal of clip A from flat slot 68. This in turn prevents withdrawal of screw 90 from hole 66.

The depth of recess 74 beneath outer surface 76 of screw mounting boss 64 is at least as great as the thickness of flange 40, and preferably slightly greater than the thickness thereof. Longitudinal movement of screw 90 into screw receiving hole 66 deforms inclined tang portion 36 downwardly in a direction away from the longitudinal axis of hole 66. Inclined tang portion 36 acts as a nut for screw 90, and resiliency of the inclined tang portion allows same to ratchet past the threads of screw 90 for rapid driving movement of the screw into its hole.

The length of hole 66 is substantially less than the length of screw 90 in order to maintain high strength in the die used to mold box B, and minimize any long slender pins or other delicate parts. With a short hole 66, tang 20 is positioned well beyond the rear end of the hole. Box B is provided with spaced-apart parallel flats 102 extending rearwardly from rear end 104 of hole 66.

Flats 102 are spaced-apart a distance which is approximately the same as, or just slightly greater than, the diameter of hole 66. Flats 102 are on opposite sides of at least portions of tang 20 in order to minimize lateral bending of tang 20 when screw 90 is rotated. In the absence of flats 102, rotation of screw 90 could cause tang 20 to deflect laterally far enough to disengage from the screw threads. Flats 102 define deflection limiting surfaces extending rearwardly from hole rear end 104 for limiting lateral deflection of tang 20.

Although the invention has been shown and described with respect to a preferred embodiment, it is obvious that equivalent alterations and modifications will occur to others skilled in the art upon the reading and understanding of this specification. The present invention includes all such equivalent alterations and modifications, and is limited only by the scope of the claims.

I claim:

1. A screw mounting arrangement comprising: a mounting member including a screw receiving hole extending inwardly thereof from an outer surface and having a hole longitudinal axis, a flat slot extending into said mounting member from said outer surface substantially parallel to said hole and in spaced relationship thereto, a connecting slot between said hole and said flat slot, said flat slot having a bottom, an abutment shoulder inwardly of said outer surface and extending from said flat slot bottom on the opposite side of said flat slot from said hole, said abutment shoulder being inclined from said flat slot bottom in directions extending away from said outer surface and away from said screw receiving hole, a substantially flat clip received in said flat slot and having a resilient tang extending therefrom toward said shoulder at a tang abutment projection and then being generally reversely curved to extend toward said longitudinal axis past the intersection of said connecting slot and hole and terminating in a screw engaging edge, said abutment projection being inclined at generally the same angle as said abutment shoulder, said connecting slot having a width at least as great as the width of said tang, said screw engaging edge being engageable by a screw receivable in said hole for deflecting said tang away from said longitudinal axis and firmly engaging said abutment projection with said shoulder to prevent withdrawal of said clip from said flat slot and to prevent withdrawal of the screw from said hole.

2. The screw mounting arrangement of claim 1 including a cam surface adjacent said outer surface aligned with said connecting slot for engaging said abutment projection to deflect said tang toward said longitudinal axis when inserting said clip in said flat slot.

3. The screw mounting of claim 1 wherein said clip has an outer end portion including a flange extending therefrom on the opposite side thereof from said hole for engaging said mounting member and limit insertion of said clip in said flat slot.

4. The screw mounting arrangement of claim 3 including a recess extending inwardly of said mounting member from said outer surface thereof on the opposite side of said flat slot from said hole for receiving said flange, said recess having a depth at least as great as the thickness of said flange whereby said clip is completely recessed inwardly of said outer surface.

5. The screw mounting arrangement of claim 1 wherein said clip has an outer end adjacent said outer surface, said tang having a flat tang portion extending from said abutment projection toward said outer end and an inclined tang portion extending from said abutment projection to said screw engaging edge, and said tang being resiliently deformable toward and away from said longitudinal axis along both said flat and inclined tang portions.

6. The screw mounting arrangement of claim 1 wherein said hole has a rear end spaced inwardly from said outer surface and said tang is positioned beyond said rear end of said hole, and said mounting member having deflection limiting surfaces on opposite sides of said tang for engagement by said tang upon lateral deflection thereof to limit such deflection and prevent disengagement of said screw engaging edge from the screw.

7. The screw mounting arrangement of claim 6 wherein said deflection limiting surfaces comprise a pair of substantially flat spaced-apart parallel surfaces which are spaced apart a distance approximately the same as the diameter of said hole.

8. A screw mounting clip comprising: a substantially flat main portion having opposite end portions, said main portion having a pair of parallel spaced-apart slits extending from one said end portion toward the other said end portion to define a resilient tang having a free tang end adjacent said one end portion and a connected tang end which is integral with said main portion adjacent said other end portion, said tang intermediate said tang ends being bent out of the plane of said main portion on one side thereof to define a tang abutment projection and then being reversely curved to define an inclined tang portion extending out of the plane of said main portion on the opposite side thereof and terminating in a screw engaging edge, and said tang abutment projection being inclined in directions extending away from said main portion and away from said other end portion, said entire tang including both said abutment projection and said inclined tang portion being resiliently deformable relative to said flat main portion of said clip generally about said connected tang end and said inclined tang portion being resiliently deformable relative to said tang abutment projection.

9. The screw mounting clip of claim 8 including a flange extending from said other end portion of said main portion in the same direction as said abutment projection.

10. The screw mounting clip of claim 8 wherein said tang inclined portion extends outwardly from said main portion a distance substantially greater than said abutment projection.

11. The screw mounting clip of claim 8 wherein said main portion has fingers on opposite sides of said tang, said fingers being cut-away along the outer edges thereof adjacent said one end portion to facilitate insertion of said main portion into a slot in a mounting member, and said tang having a length greater than the length of said fingers.

* * * * *